Feb. 14, 1928.

T. C. LENNOX 1,659,110

CONTINUOUS CURRENT TRANSFORMER

Filed Aug. 20, 1925    2 Sheets-Sheet 1

Inventor:
Thomas C. Lennox,
by
His Attorney.

Inventor:
Thomas C. Lennox,
by
His Attorney.

Patented Feb. 14, 1928.

1,659,110

UNITED STATES PATENT OFFICE.

THOMAS C. LENNOX, OF PITTSFIELD, MASSACHUSETTS, ASSIGNOR TO GENERAL ELECTRIC COMPANY, A CORPORATION OF NEW YORK.

CONTINUOUS-CURRENT TRANSFORMER.

Application filed August 20, 1925. Serial No. 51,493.

My invention relates to apparatus for transforming direct current energy from one voltage to another voltage.

In my copending application Serial No. 51,494, patented July 5, 1927, Patent No. 1,635,002, filed concurrently herewith, I have described direct current transforming apparatus comprising a commutating device for converting direct current of one voltage into alternating current, an intermediate transformer for producing the desired change in voltage and a second commutating device for reconverting the alternating current back into direct current of a different voltage. In said application I have described a special type of commutating arrangement to prevent sparking in which separate synchronous generators are provided to furnish the normal and load corrective excitation for the transformer. In certain cases, as where the apparatus is used in direct current railway installations, the change in direct current line voltage and current is so sudden and severe that the synchronous generators of my copending application may not function quickly enough to provide the desired automatic change in excitation necessary for maintaining desirable commutating conditions. The present application relates to direct current transforming equipment of the same general construction as that of my copending application in which the synchronous generators for supplying excitation to the intermediate transformer are replaced by static condensers.

I have found that by this means the apparatus may be made to respond to very sudden changes in direct current voltage and that the apparatus may be greatly simplified.

In my prior application the synchronous generators referred to were necessary solely because the transformers have some exciting current and leakage reactance voltage. In accordance with my present invention I have discovered that by placing sufficient condensance in parallel and in series with the transformers so as to make the circuits resonant at the frequency at which the apparatus operates, the apparatus becomes equivalent to one having transformers with zero leakage reactance and zero exciting current. This is because the transformers take lagging current and the condensers take leading current and by properly adjusting the constants of these two parts, leading current will neutralize or balance the lagging current so that the residue drawn from the commutator and the direct current line will be in phase with the voltage and not cause flashing.

Figure 2:
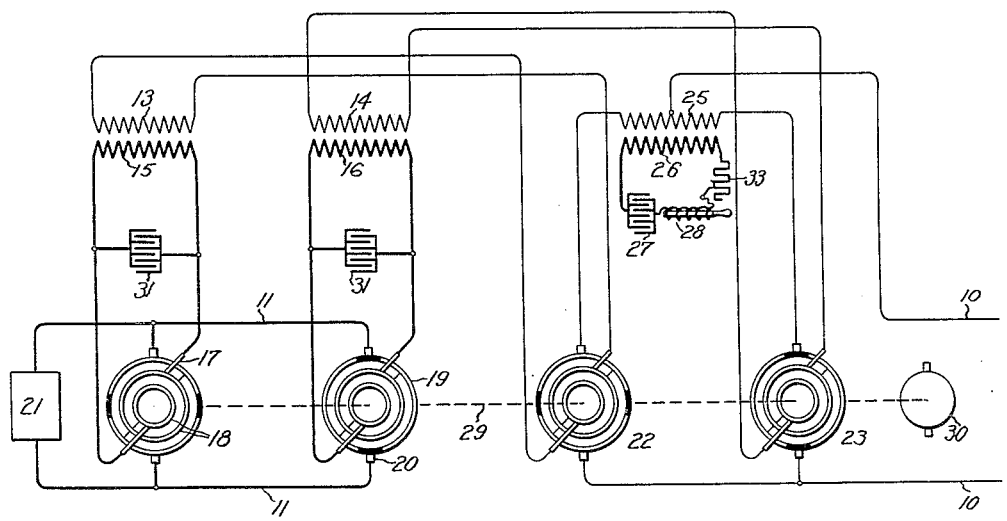
Figure 1:
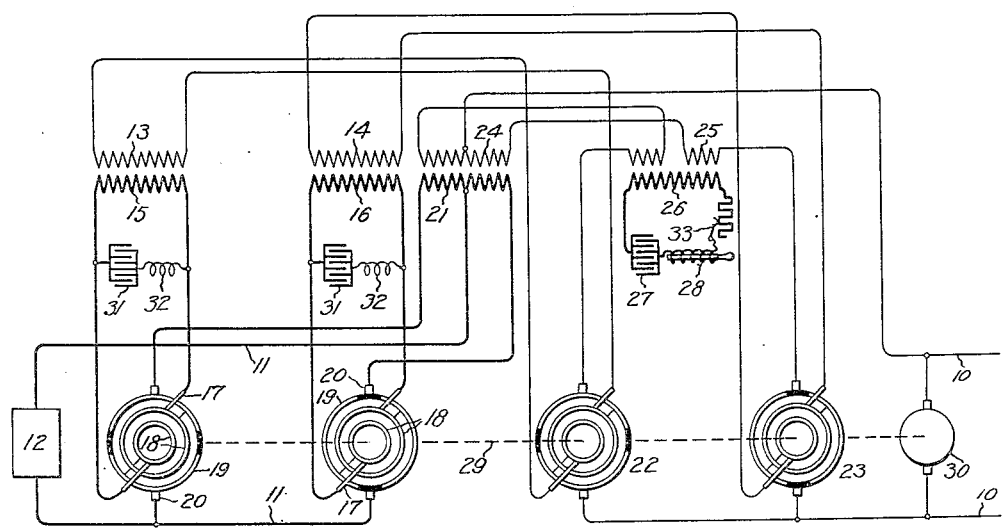
Figure 3:
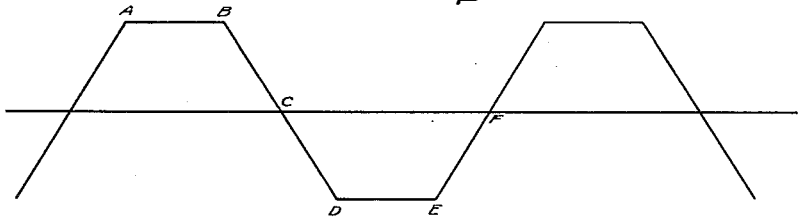

The features of my invention which are believed to be novel and patentable will be pointed out in the claims appended hereto. For a better understanding of the invention and to explain certain details of refinements thereof not heretofore mentioned, reference is made in the following description to the accompanying drawing in which Figs. 1 and 2 are modifications of my invention wherein the transformers are represented as being stationary and Figs. 3 to 6 are explanatory diagrams. The brush transformer represented in Fig. 1 is omitted in Fig. 2.

Referring to Fig. 1, 10 may be considered a high voltage direct current source of supply and 11 a low voltage direct current line supplying a load 12, 13 and 14 represent the primary windings of the main transformer which is made up of two single phase transformers connected through the rectifying commutators in quadrature. 15 and 16 represent the corresponding secondary windings. The secondary windings are connected through brushes 17, slip rings 18, rectifying commutators 19 and brushes 20 to the low voltage circuit 11. Inserted between the brushes of one polarity and the corresponding side of the line 11 is the secondary 21 of a brush transformer, the middle point of which constitutes the line terminal. The primary windings 13 and 14 are connected through a second set of rectifying devices, 22 and 23, to the high voltage circuit 10, the primary 24 of the brush transformer being inserted between one side of the direct current line 10 and the direct current brushes of corresponding polarity. The brush transformer has the same ratio of transformation as the main transformer. In series with the circuits leading from the high voltage rectifiers 22 and 23 to the brush transformer primary 24 is a transformer 25 having two primary coils connected as just mentioned, and a secondary coil 26, which is connected across a condenser 27.

The various rotating parts of the rectifying devices are mounted on a common shaft, indicated at 29 and driven by a constant speed motor 30. The apparatus is reversible, that is the flow of energy may be from circuit 11 to circuit 10.

In this apparatus the direct current from source 10 is changed to alternating current by means of the devices 22 and 23 and these devices supply this alternating current to primary transformer windings 13 and 14 respectively in a quarter phase relation due to the quadrature relation of the commutators. The transformers change the voltage to that desired and supply the circuit 11 through the rectifiers associated therewith. It will be noted that all of the mechanical rectifying commutators have dead segments which are wider than the brushes and consequently there is no chance for a brush to momentarily short-circuit a transformer coil as is generally the case with apparatus of this character. For the sake of convenience the rectifiers herein described will hereinafter be termed rectifiers of the open circuit type.

As pointed out in my copending application previously referred to, the transformers cannot receive their magnetizing current from the direct current lines because this current being required to flow in a highly reactive circuit will resist interruption and cause flashing at the commutators. In the present invention condensers 31 are provided in parallel to either the primaries or secondaries of the transformers for supplying this excitation. These condensers are properly adjusted to draw a leading current which balances the lagging current of excitation and flashing is thus avoided. Actually the balance of currents described above is complicated by the presence of harmonic currents of higher frequencies than the fundamental. These harmonic currents result from two major causes, first, the varying permeability of the transformer cores with changing flux density, and second, the variation from sinusoidal applied voltage due to the action of the commutator. In spite of the flow of these currents of harmonic frequencies satisfactory operation can be obtained by selecting such size of condenser as will result in substantially zero value of total current (fundamental plus harmonics) at the instant of opening the circuit by the commutator. The problem is simplified when the condensers are connected directly to the terminals of the transformer by the fact that any small residue of current flowing at the instant of opening can flow into the condenser without causing appreciable voltage to appear at the commutator and consequently without sparking.

Largely as a result of the above action of the condensers in absorbing any current residue, it is possible to simplify the transformer arrangement by omitting the brush transformer as shown in Fig. 2. When this is done the alternating voltage applied to the main transformer becomes the whole of that resulting from the commutator action which deviates farther from the sinusoidal than is the case where brush transformers are used so that the harmonic currents may be expected to be more pronounced.

If it is desired to minimize the harmonic currents inductive coils 32 may be placed in series with the condensers and the latter increased in capacity, as represented in Fig. 1. These inductive coils will serve to limit the leading current taken by the condensers but as their effect will be much greater at high than at low frequencies they will limit the flow of harmonic currents very much more than the fundamental so that if the capacitance is increased so as to result in the same fundamental leading current as before, the harmonic leading currents will be very greatly reduced.

When this arrangement is used, it is evident that brush transformers are necessary in order to permit the voltage across the main transformers adjustaing itself to a form more closely approximating the sine wave and thus limiting the flow of harmonic exciting currents as these harmonic currents can no longer be freely absorbed by the condensers.

Figure 4:
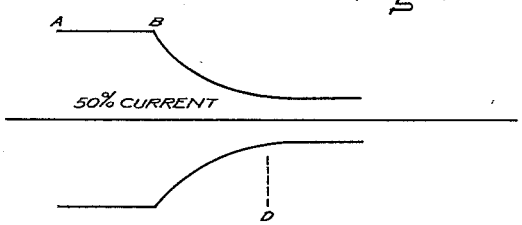
Figure 5:
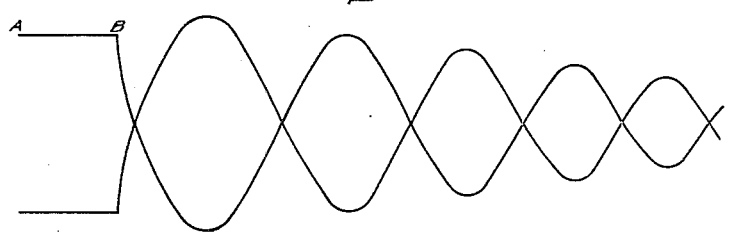
Figure 6:
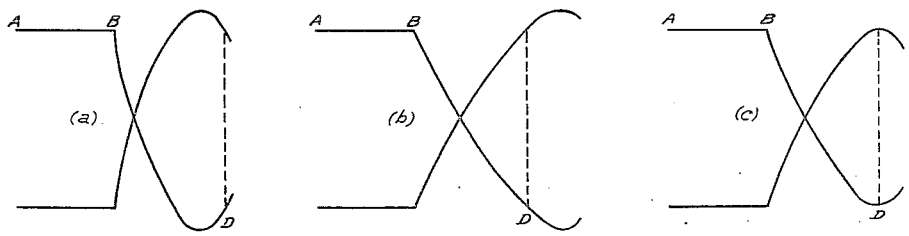

Considering now the condenser 27 placed in series with the circuits for compensating the inductive effect of the transformer winding which results from their leakage reactance. Whether such condensers are placed in the main transformer circuits directly or through intermediate transformers and thus carry current of fundamental (commutator) frequency or whether they are placed in the brush circuit through transformers which separate alternating current from direct current as shown and carry currents at multiple (brush) frequency, they will be carrying currents which deviate from the sinusoidal in form. However, by properly adjusting the constants of this circuit, as by adjustable reactance 28 and adjustable resistance 33, it is possible to bring the current in each brush to zero at the instant of opening. The current in the series condenser circuit is the resultant of the alternating component of the pulsating currents in the two arms of the brush transformer. This current should have approximately the form shown in Fig. 3. During the time A to B the whole load is being carried by one phase of the main transformer and the corresponding arm of the brush circuit. At B the open circuit on the second phase is closed by the commutator. The load may then divide between the phases. As they will be designed for substantially equal resistance the load will tend to divide equally and until that condition is established, a voltage consisting of the difference in the resistance drops in the two circuits will exist which will tend to bring such division about. Thus if the circuits have resistance and inductance only, the current in the first phase would start to decrease gradually toward a valve 50% of its original value and that in the other phase, to rise toward the same value as represented in Fig. 4. The result will be that when the commutator opens the first phase at D, it will be required to rupture a current of something more than half the full load current. This difficulty is overcome by having the condenser associated in series relation with the circuit as shown in the drawing. Now the current, instead of decreasing in one phase and rising in the other toward a 50% value, will tend to oscillate in the condenser circuit as indicated in Fig. 5. Now by suitably adjusting the amount of resistance, inductance and condensance in the circuit together with the frequency of commutation, this oscillating current may be made such that the current in the first phase will be passing through zero at the instant at which the commutator opens this circuit. This may be brought about in three general ways as shown in Fig. 6, (a), (b) and (c). Obviously (c) is the preferable form as it provides for opening the circuit at a time when not only the current but the ratio of the change in current is zero. At (a) we see that the circuit has too much resistance; at (b) it has too much inductance, while at (c) we have the correct proportion of resistance, inductance and capacitance. Thus I provide this correct proportion of resistance, inductance and capacitance in series relation with the load circuit of the main transformer so that the current will pass from one arm of the brush transformer to the other in the manner described and pictured in Fig. 6 (c). The amount of resistance provided is generally fixed at the minimum amount practicable in the windings of the transformer as it is the cause of the I²R loss of the apparatus which it is desirable to minimize. The necessary inductance may be provided as leakage reactance between the transformer windings and the condenser may be provided externally as shown. If it is not found practicable to obtain the exact value of inductance needed as leakage reactance in the transformer, a separate reactor may be furnished as represented at 28. This may be adjustable for obtaining the exact current action desired. If desirable, an external adjustable resistance such as represented at 33 may be provided in any case where the resistance of the circuits are otherwise insufficient in proportion to the reactance.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:

1. A continuous current transformer apparatus comprising a polyphase transformer, rectifying commutators associated with each phase of the primary and secondary windings of said transformer, a brush transformer having its primary and secondary windings respectively connected across the primary and secondary rectifying contacts of the same polarity, condensers associated with said transformer for neutralizing the lagging current of excitation thereof, and means for driving said rectifying commutators in synchronism.

2. A continuous current transforming apparatus comprising a polyphase transformer, rectifying commutators associated with each phase of the primary and secondary windings of said transformer, a brush transformer having its primary and secondary windings respectively connected across the primary and secondary rectifying contacts of the same polarity, condensers connected in parallel with said transformer for neutralizing the lagging current of excitation thereof and reactors in series with said condensers for damping the flow of harmonic currents, and means for driving said rectifying commutators in synchronism.

3. A continuous current transforming apparatus comprising a polyphase transformer, rectifying commutators of the open circuit type associated with each phase of the primary and secondary windings of said transformers, a brush transformer having the same ratio of transformation as said polyphase transformer, having its primary and secondary windings respectively connected across the primary and secondary rectifying contacts of the same polarity, condensers associated in parallel relation with said transformer for neutralizing the lagging current of excitation thereof, and means for driving said rectifying commutators in synchronism.

4. A continuous current transforming apparatus comprising a polyphase transformer, mechanical rectifying devices associated with the phases of the primary and secondary windings of said transformer, condensers associated in parallel relation with said transformer for neutralizing the lagging current of excitation thereof and condenser apparatus connected in series relation with said transformer for compensating for its reactance.

5. A continuous current transforming apparatus comprising a polyphase transformer, mechanical rectifying devices associated with the primary and secondary circuits of said transformer, condensers associated with said transformer for neutralizing the lagging current of excitation, condenser apparatus connected in series relation with said transformer for compensating for its reactance, and an impedance in series with said last mentioned condenser apparatus for adjusting the constants of the circuit.

6. In combination, a polyphase transformer, a direct current line, a polyphase mechanical rectifier connected between said transformer and line whereby direct current may be converted to alternating current or vice versa, an auxiliary transformer having primary winding sections connected between the direct current contacts of one polarity of said mechanical rectifier with equal sections in series relation with the direct current line of corresponding polarity, and a condenser connected in series with the secondary of said transformer.

7. A continuous current transforming apparatus comprising a polyphase transformer, mechanical rectifying devices associated with the phases of the primary and secondary windings of said transformer, condenser apparatus associated in parallel relation with said transformer for neutralizing the lagging current of excitation thereof, and condenser apparatus connected in series relation with said transformer for compensating for its reactance, the total resistance inductance and condensance of the series circuit being such that the load current will constantly transfer from one phase to another during the time when such phases are active and to cause the current in any phase to have substantially zero value and zero rate of change when its circuit is opened.

8. A continuous current transforming apparatus comprising a polyphase transformer, mechanical rectifying devices associated with the phases of the primary and secondary windings of said transformer, condenser apparatus associated in parallel relation with said transformer for neutralizing the lagging current of excitation thereof, and condenser apparatus connected in series relation with said transformer for compensating for its reactance, the total resistance, inductance and condensance of the series circuit being such that the load current will constantly transfer from one phase to another during the time when such phases are active.

In witness whereof, I have hereunto set my hand this 11th day of August, 1925.

THOMAS C. LENNOX.